(12) United States Patent
Sherkin et al.

(10) Patent No.: US 9,166,794 B2
(45) Date of Patent: Oct. 20, 2015

(54) SECURING PRIVATE KEY ACCESS FOR CROSS-COMPONENT MESSAGE PROCESSING

(75) Inventors: Alexander Sherkin, Woodbridge (CA); Ravi Singh, Toronto (CA); Nikhil Vats, Vaughan (CA); Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 447 days.

(21) Appl. No.: 13/296,514

(22) Filed: Nov. 15, 2011

(65) Prior Publication Data

US 2012/0131346 A1     May 24, 2012

Related U.S. Application Data

(60) Provisional application No. 61/413,970, filed on Nov. 15, 2010.

(51) Int. Cl.
*H04L 9/32*        (2006.01)
*H04W 12/10*     (2009.01)
(Continued)

(52) U.S. Cl.
CPC .......... *H04L 9/3247* (2013.01); *H04L 12/5895* (2013.01); *H04L 51/38* (2013.01);
(Continued)

(58) Field of Classification Search
CPC ....... H04L 9/3247; H04L 9/3226; H04L 9/08; H04L 9/0816; H04L 9/0894; H04L 9/0897; H04L 63/12; H04L 63/06; H04W 12/04; H04W 12/10
USPC ................... 713/176, 180, 181; 380/277, 286
See application file for complete search history.

(56) References Cited

U.S. PATENT DOCUMENTS 5,418,854 A   *   5/1995   Kaufman et al. ............. 713/156
5,764,899 A        6/1998   Eggleston et al.
(Continued)

FOREIGN PATENT DOCUMENTS

EP         1420554 A     5/2004
EP         1919084 A1    5/2008
(Continued)

OTHER PUBLICATIONS

Extended European Search Report relating to application No. 09161927.0, dated Nov. 8, 2010.
(Continued)

*Primary Examiner* — Zachary A Davis
(74) *Attorney, Agent, or Firm* — Ridout & Maybee LLP

(57) ABSTRACT

Often, for reasons of wireless bandwidth conservation, incomplete messages are provided to wireless messaging devices. Employing cryptography, for secrecy or authentication purposes, when including a received message that has been incompletely received can lead to lack of context on the receiver's end. By automatically obtaining the entirety of the message to be included, an outgoing message that includes the received message can be processed in a manner that securely and accurately represents the intended outgoing message. Alternatively, a server can assemble a composite message from a new message and an original message and, in cooperation with a wireless messaging device, sign the composite message. Since signing the composite message involves access to a private key, access to that private key is secured such that such access to the private key can only be arranged responsive to an explicit request for a hash that is to be signed using the private key.

20 Claims, 15 Drawing Sheets

(51) Int. Cl.
*H04L 12/58* (2006.01)
*H04W 12/04* (2009.01)
*H04L 29/06* (2006.01)

(52) U.S. Cl.
CPC ............ *H04L 63/068* (2013.01); *H04W 12/04* (2013.01); *H04W 12/10* (2013.01); *H04L 63/067* (2013.01); *H04L 63/12* (2013.01)

(56) References Cited

U.S. PATENT DOCUMENTS

| | | | |
|---|---|---|---|
| 6,134,582 | A | 10/2000 | Kennedy |
| 6,289,105 | B1 | 9/2001 | Murota |
| 6,834,112 | B1 * | 12/2004 | Brickell ........................ 380/279 |
| 7,043,456 | B2 * | 5/2006 | Lindskog et al. ............... 705/76 |
| 7,181,762 | B2 * | 2/2007 | Jerdonek ............................ 726/2 |
| 7,254,706 | B2 * | 8/2007 | Gougeon et al. ............. 713/156 |
| 7,533,269 | B2 * | 5/2009 | Kumagai et al. ............. 713/176 |
| 7,958,364 | B2 * | 6/2011 | Lee et al. ..................... 713/176 |
| 2004/0090457 | A1 | 5/2004 | Serdy et al. |
| 2004/0186990 | A1 | 9/2004 | Lai et al. |
| 2004/0205330 | A1 | 10/2004 | Godfrey et al. |
| 2005/0071636 | A1 * | 3/2005 | Lee et al. ...................... 713/170 |
| 2005/0163320 | A1 * | 7/2005 | Brown et al. .................. 380/270 |
| 2006/0031299 | A1 | 2/2006 | Robertson |
| 2006/0036865 | A1 | 2/2006 | Brown et al. |
| 2006/0085509 | A1 | 4/2006 | Wener |
| 2009/0034729 | A1 * | 2/2009 | Brown et al. .................. 380/270 |

FOREIGN PATENT DOCUMENTS

| | | |
|---|---|---|
| EP | 2020789 A1 | 2/2009 |
| WO | 2005107140 A1 | 11/2005 |

OTHER PUBLICATIONS

Murphy, Galvin S. et al. "Security Multiparts for MIME: Multipart/Signed and Multipart/Encrypted; rfc1847.txt". Oct. 1995, IETF Standard, Internet Engineering Task Force, IETF, CH XP015007632. ISSN: 0000-0003.

B. Kaliski, "Public-Key Cryptography Standards (PKCS) #8: Private-Key Information Syntax Specification Version 1.2"; Network Working Group, May 2008.

* cited by examiner

| PRIVATE KEY ACCESS KEY | PRIVATE KEY |
|---|---|
| 0 B62F 17E5 CE1E 5DDD 5DD8 94D5 881A 4E1E | 2DF1 844D 75C2 E226 0A97 6A40 58B5 3DA7 |
| 1 A90E 302A A57A 8BFF 9BED 486F 7CD6 BA21 | E5BE 3089 AEB8 5C44 D89D 48CE 8614 8A66 |
| 2 D3C7 D94E 7684 2E63 6FB5 21BD F35A E884 | CB7C 6113 5D70 B888 BE5B 7958 34CC E6AA |

FIG. 14

SECURING PRIVATE KEY ACCESS FOR CROSS-COMPONENT MESSAGE PROCESSING

CROSS-REFERENCE TO RELATED APPLICATIONS

The present application claims priority from U.S. Provisional Patent Application Ser. No. 61/413,970, filed Nov. 15, 2010, the contents of which are hereby incorporated herein by reference.

FIELD

The present application relates generally to mobile wireless electronic messaging and, more specifically, to processing a message with the involvement of more than one component, the processing involving secure private key access.

BACKGROUND

In one manner of processing (e.g., signing) an outgoing e-mail message, a communication application, employed by a given user, generates a hash (also called a "digest") of the outgoing e-mail message and signs the hash of the outgoing e-mail message using a private key half of a public-private key pair. The signed hash of the outgoing e-mail message may then be transmitted along with the outgoing e-mail message as a signature. Upon receiving the e-mail message, the recipient may be provided with a degree of certainty that the received e-mail message originated with the given user by generating a hash of the e-mail message, decrypting the signature using a public key half of the public-private key pair and finding that the hash of the e-mail message matches the result of the decrypting.

BRIEF DESCRIPTION OF THE DRAWINGS

Reference will now be made to the drawings, which show by way of example, embodiments of the application, and in which:

FIG. 14 illustrates an alternative table to the table of FIG. 10 wherein each record includes a private key access key in a private key access key column and a private key in a private key column.

DETAILED DESCRIPTION OF THE EMBODIMENTS

Figure 1:
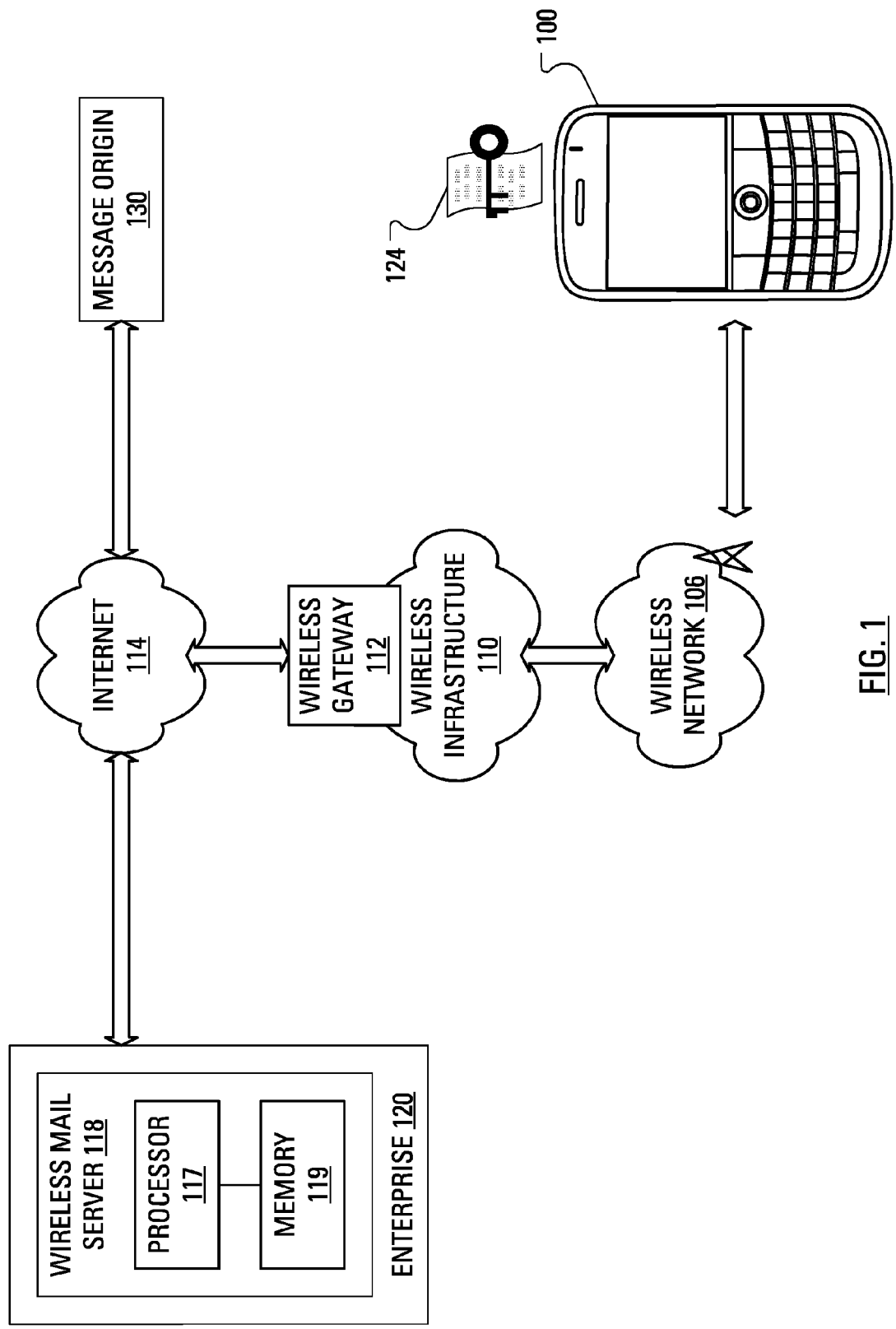
FIG. 1 illustrates an overview of an example system including a mobile communication device and a wireless mail server.

When a mobile wireless device is used to receive and transmit e-mail, the mobile wireless device is often associated with a mobile mail server. The mobile mail server manages the transmission of messages to the mobile wireless device to optimize use of the limited resources of a wireless communication channel in the path between the mobile wireless device and the mobile mail server. The mobile mail server may also manage messages transmitted by the mobile wireless device to optimize in a similar fashion.

For a first example of optimization of transmission of messages to the mobile wireless device, by only transmitting an initial portion of a first e-mail message to the mobile wireless device, the mobile mail server may conserve wireless resources that would otherwise be consumed by transmitting the entire first e-mail message.

It is common, in e-mail communication applications, to include the text of a received e-mail message when composing an e-mail message in response or when forwarding the e-mail message to a further recipient. However, in a mobile communication system, when sending a new e-mail message related to an original e-mail message, the mobile wireless device may only be able to include the initial portion of the original e-mail message in the new e-mail message, since the mobile wireless device may only have the initial portion of the original e-mail message available. Upon receiving the new e-mail message, the cleverly designed mobile mail server may append the remaining (i.e., non-initial) portion of the original e-mail message before forwarding the entire new e-mail message toward its destination. Conveniently, this scheme conserves wireless communication channel resources.

However, when a user of the mobile wireless device wishes to sign the new e-mail message, obtaining the efficiency of previously described schemes becomes challenging.

For example, consider receipt, at the mobile wireless device, of an initial portion of a first e-mail message. The user of the mobile wireless device reviews the initial portion of the first e-mail message and composes a response to the first e-mail message. The response may be considered a second e-mail message. The second e-mail message may be considered to have at least two portions: an "old" portion, comprising the initial portion of the first e-mail message; and a "new" portion, comprising the content composed by the user of the mobile wireless device. The user of the mobile wireless device may decide to sign the second e-mail message. Accordingly, when obtaining a signature to associate with the second e-mail message, the mobile wireless device may only obtain a hash of the second e-mail message (i.e., the old portion appended to the new portion). That is, the mobile wireless device encrypts a hash of the second e-mail message with the private key stored at the mobile wireless device. The mobile mail server would normally append the remaining (i.e., non-initial) portion of the first e-mail message to the received second e-mail message to form a complete response, before forwarding the complete response to the origin of the first e-mail message. However, since the signature received in association with the second e-mail message only relates to the old portion appended to the new portion, and not to the complete response, the mobile mail server must simply forward the second e-mail message and associated signature toward the origin of the first e-mail message.

At the origin of the first e-mail message, the recipient of the second e-mail message does not receive all of the typically appended first e-mail message content and, accordingly, may struggle with the placing of the second e-mail message properly in context.

To provide awareness to the sender of the second e-mail message (i.e., the user of the mobile wireless device) that the second e-mail message will include only a truncated version of the first e-mail message, the mobile wireless device may display a warning dialog. The warning dialog may be displayed responsive to the user of the mobile wireless device indicating, using a user interface in a message composition mode, that the second e-mail message is to be sent. The warning dialog may indicate "Warning! Your message will be truncated." Furthermore, the warning dialog may be interactive and may require user selection of a choice before the warning dialog may be dismissed from the display. That is, the warning dialog may present choices labeled "OK" and "Cancel". Additionally, the warning dialog may include a checkbox labeled "Don't show this dialog again". The user may select the "OK" choice to indicate acceptance of the truncation. Alternatively, the user may select the "Cancel" choice to indicate a wish to return to composing the message. By selecting the checkbox labeled "Don't show this dialog again" and then selecting the "OK" choice, the user may effectively set a policy for the mobile wireless device, where the policy indicates that all future signed, and/or encrypted, messages are to include only a truncated version of the original received message.

Upon receiving an indication that the user has selected the "OK" choice, the mobile wireless device may proceed to transmit the second e-mail message to the mobile mail server for forwarding to the sender of the first e-mail message.

Upon receiving an indication that the user has selected the "Cancel" choice, the mobile wireless device may return the user interface to the message composition mode. Responsive to being returned to the message composition mode, the user may manipulate the user interface to copy, to a clipboard, the message that has been typed (i.e., the new portion). The user may then close the message composition user interface, return to a message list and re-open the first message. Once the initial portion of the first message is open, the user may manipulate a message viewing user interface to request, from the mobile mail server, the entire first message. The user may then manipulate the message viewing user interface to indicate a wish to compose a response to the first message. Once the message composition user interface has been opened, pre-loaded with the entirety of the first e-mail message, the user may paste the previously composed new portion from the clipboard to the message composition area in the message composition user interface, thereby creating a third e-mail message. The third e-mail message may be distinguished from the second e-mail message in that the third e-mail message includes the entirety of the first e-mail message and the second e-mail message only includes a truncated version of the first e-mail message. The user may then create a signature for the third e-mail message and indicate that the third e-mail message and the signature are to be sent.

One can see that including an entire original message in a signed response can require manually carrying out some potentially tedious and complex steps.

Signing a composite message that has been created at a server may involve access to a private key at a mobile device. Accordingly, access to that private key may be secured such that such access to the private key can only be arranged responsive to an explicit request for a hash that is to be signed using the private key.

In an aspect of the present disclosure there is provided a method of processing an electronic message at a mobile wireless communication device. The method includes: detecting receipt of an instruction to sign a message, where the message is to include a new portion and an original message; generating a first access key; inserting a record in a table, the record including the first access key and a secondary value for use in obtaining a private cryptographic key; and transmitting a processing request to a server associated with the mobile wireless communication device, the request including the new portion, a reference to the original message and the first access key. The method further includes: receiving a signing request from the server, the signing request including a hash and a second access key, employing the second access key to obtain the private cryptographic key; employing the private cryptographic key to encrypt the hash to form a digital signature; and transmitting the digital signature to the server. In other aspects of the present application, a mobile wireless communication device is provided for carrying out this method and a computer readable medium is provided for adapting a processor to carry out this method.

In another aspect of the present disclosure there is provided a method of processing a message. The method includes: receiving a transmission request to transmit a cryptographically signed message, the transmission request including an access key, a new message portion and a reference to an original message; extracting an access key from the transmission request; creating the composite message from the new message and the original message; and generating the hash. The method further includes: transmitting a signing request to sign the hash, the signing request including the access key; receiving a signed hash; and transmitting the composite message in association with the signed hash. In other aspects of the present application, a mail server is provided for carrying out this method and a computer readable medium is provided for adapting a processor to carry out this method.

Other aspects and features of the present application will become apparent to those of ordinary skill in the art upon review of the following description of specific embodiments of the application in conjunction with the accompanying figures.

Referring to FIG. 1, an overview of an example system for use with the embodiments described below is shown. One skilled in the art will appreciate that there may be many different topologies, but the system shown in FIG. 1 helps demonstrate the operation of the systems and methods described in the present application. For example, there may be many mobile communication devices connected to the system that are not shown in the overview of FIG. 1.

FIG. 1 shows a mobile wireless device in the form of a mobile communication device 100. It will be appreciated by those skilled in the art that the mobile communication device 100 may comprise any computing or communication device that is capable of connecting to a network by wireless means, including, but not limited to, personal computers (including tablet and laptop computers), personal digital assistants, smart phones, and the like. It will further be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "mobile device", "communication device", "computing device", or "user device" may be used interchangeably.

The mobile communication device 100 may, for example, be connected to an Internet Service Provider on which a user of the system of FIG. 1, likely the user associated with the mobile communication device 100 illustrated in FIG. 1, has an account.

The mobile communication device 100 may be capable of sending and receiving messages and other data via wireless transmission and reception, as is typically done using electromagnetic waves in the radio frequency (RF) spectrum. The exchange of messages and other data may occur, for instance, between the mobile communication device 100 and a base station in a wireless carrier network 106. The mobile communication device 100 may receive data by other means, for example through a direct connection to a port provided on the mobile communication device 100. An example of such a direct connection is a Universal Serial Bus (USB) link.

As illustrated in FIG. 1, the wireless carrier network 106 connects to a wide area network 114, represented as the Internet, via a wireless infrastructure 110. The wireless infrastructure 110 incorporates a wireless gateway 112 for connecting to the Internet 114.

A connection between the mobile communication device 100 and the Internet 114 allows the mobile communication device 100 to access a wireless mail server 118. The wireless mail server 118 may include a processor 117 and a memory 119. The wireless mail server 118 may be grouped together with other servers (not shown) in an enterprise 120. Also connected to the Internet 114 may be a representative message origin 130. The mobile communication device 100 may store a private cryptographic key 124 that is associated with a corresponding public cryptographic key.

Figure 2:
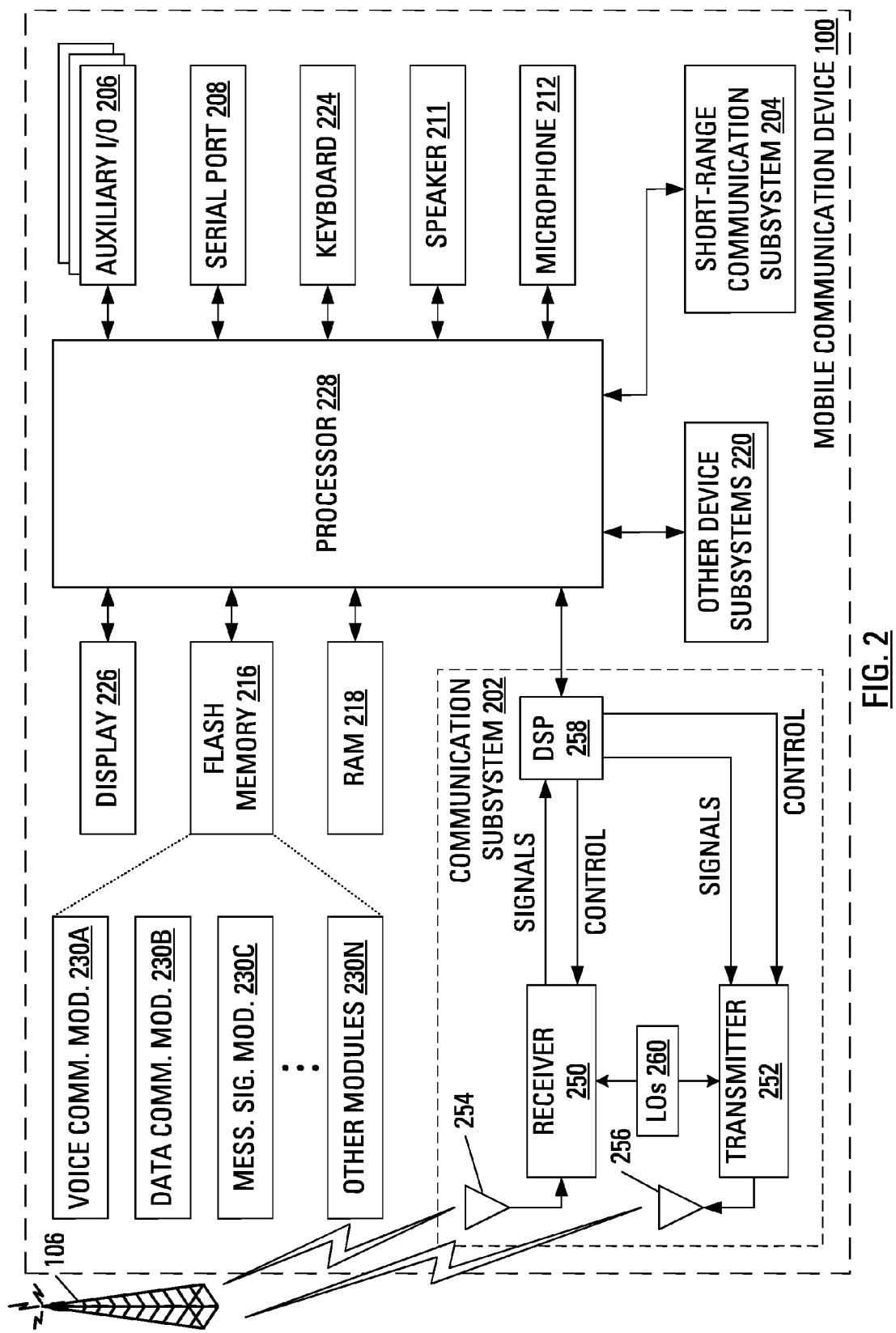
FIG. 2 illustrates a schematic representation of components of the mobile communication device of FIG. 1.

FIG. 2 illustrates the mobile communication device 100. The mobile communication device 100 includes a housing, an input device (e.g., a keyboard 224 having a plurality of keys) and an output device (e.g., a display 226), which may be a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a processor 228) is shown schematically in FIG. 2 as coupled between the keyboard 224 and the display 226. The processor 228 controls the operation of the display 226, as well as the overall operation of the mobile communication device 100, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the processor 228, other parts of the mobile communication device 100 are shown schematically in FIG. 2. These may include a communications subsystem 202, a short-range communications subsystem 204, the keyboard 224 and the display 226. The mobile communication device 100 may further include other input/output devices, such as a set of auxiliary I/O devices 206, a serial port 208, a speaker 211 and a microphone 212. The mobile communication device 100 may further include memory devices including a flash memory 216 and a Random Access Memory (RAM) 218 and various other device subsystems 220. The mobile communication device 100 may comprise a two-way radio frequency (RF) communication device having voice and data communication capabilities. In addition, the mobile communication device 100 may have the capability to communicate with other computer systems via the Internet.

Operating system software executed by the processor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The processor 228, in addition to its operating system functions, enables execution of software applications on the mobile communication device 100. A predetermined set of software applications that control basic device operations, such as a voice communications module 230A and a data communications module 230B, may be installed on the mobile communication device 100 during manufacture. A message signing module 230C may also be installed on the mobile communication device 100 during manufacture, to implement aspects of the present disclosure. As well, additional software modules, illustrated as an other software module 230N, which may be, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 106 represented by a radio tower. The data items managed by the PIM application may be seamlessly integrated, synchronized and updated via the wireless carrier network 106 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile communication device 100 is intended to operate. For example, the communication subsystem 202 of the mobile communication device 100 may be designed to operate with the MOBITEX™, DATATAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 106. Signals received from the wireless carrier network 106 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 106 are processed (e.g., modulated and encoded) by the DSP 258 and are then provided to the transmitter 252 for digital to analog conversion, frequency up conversion, filtering, amplification and transmission to the wireless carrier network 106 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the processor 228. The received signal is then further processed by the processor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 106 via the communication subsystem 202.

In a voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the mobile communication device 100. In addition, the display 226 may also be utilized in voice communication mode, for example, to display the identity of a calling party, the duration of a voice call, or other voice call related information.

The short-range communications subsystem 204 enables communication between the mobile communication device 100 and other proximate systems or devices, which need not necessarily be similar devices. For example, the short-range communications subsystem may include an infrared device and associated circuits and components, or a BLUETOOTH™ communication module to provide for communication with similarly-enabled systems and devices.

In overview, the mobile communication device 100 receives an initial portion of a first e-mail message from the wireless mail server 118, where the first e-mail message has originated at the representative message origin 130. The user of the mobile communication device 100 manipulates the mobile communication device 100 to invoke a message composition user interface preloaded with the received initial portion of the first e-mail message and composes a new portion. Where the user has specified that the message is to be processed (e.g., signed and/or encrypted), responsive to the user indicating that the message is to be sent, aspects of the present disclosure allow for the processing of a new message that includes the new portion and the entirety of the first e-mail message.

For example, the message composition user interface may allow the user to specify that the message is to be signed. Typically, when the user has indicated that the message is to be sent, the message composition user interface prompts the user for a password associated with a key store in which the private cryptographic key 124 is stored. Upon verifying a received password, the processor 228 executes a message signing algorithm to generate a signature by, first, generating a hash of the message and, second, encrypting the hash with the private cryptographic key 124.

In a first cross-component message processing approach, some automation is provided to the complex operations. Responsive to the user indicating that a reply message with truncated original message is to be sent, it is proposed herein to prompt the user with a dialog that includes a user option to "Download Original". Responsive to receiving an indication that the "Download Original" user option has been selected, the processor 228 may automatically download the remainder of the original message and append the remainder of the original message to the reply message. The processor 228 may then sign the reply message with the entire original message, encrypt the reply message with the entire original message or both sign and encrypt the reply message with the entire original message before sending, thereby providing full, end-to-end security.

Figure 3:
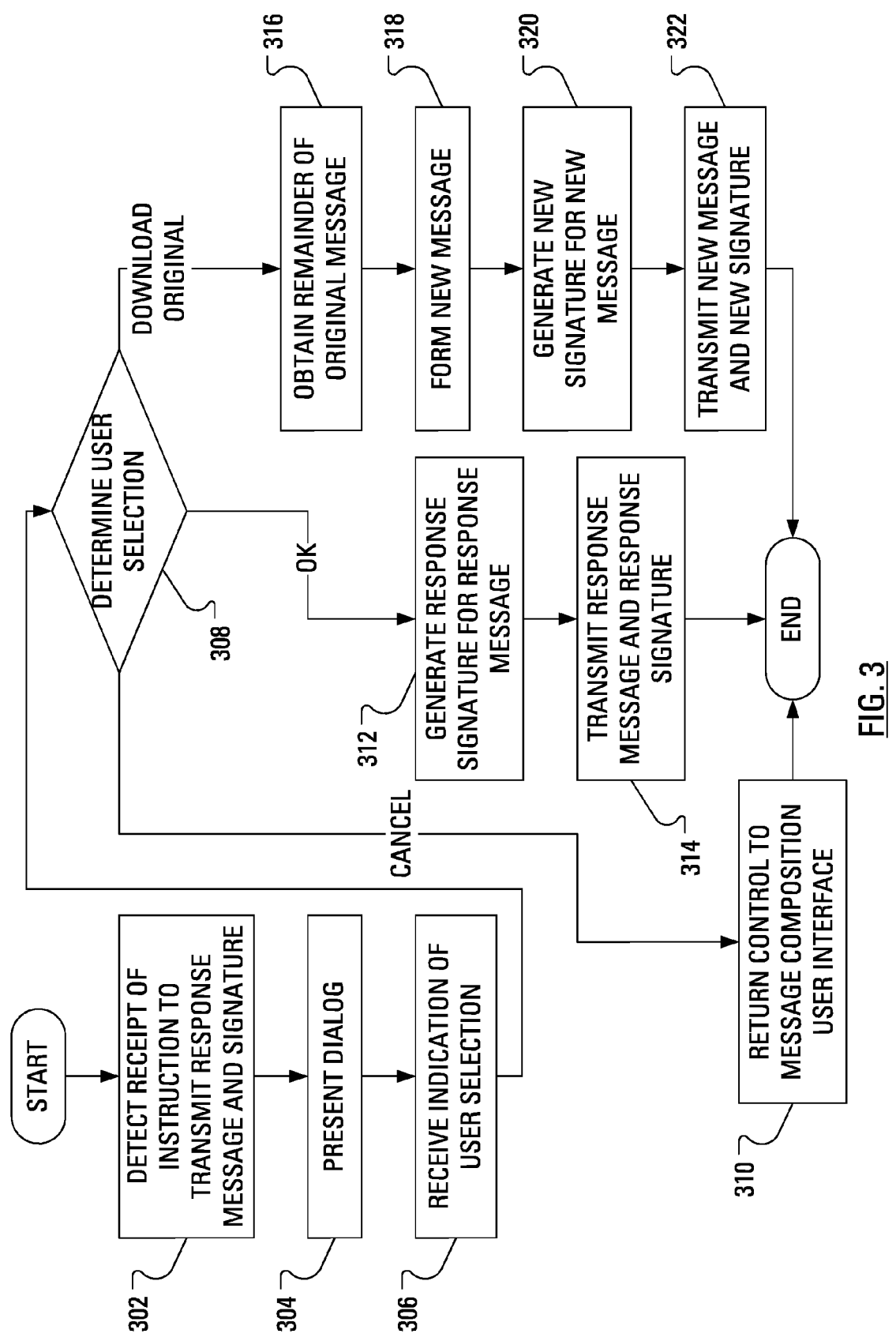
FIG. 3 illustrates example steps in a first method of processing an electronic message at the mobile communication device of FIG. 1, where the processing comprises signing.

Steps of a method that is an example of a first cross-component message signing approach are presented in FIG. 3. Initially, the processor 228, or, more accurately, a signature handling application executed on the processor 228, detects receipt (step 302) of an instruction to transmit a response message and an associated signature. Such an instruction may be received from the message composition user interface application also executed on the processor 228.

From the user's perspective, the user has specified that the response message is to be signed and the user has composed the new portion of the response message (in any order). The user may have configured the mobile communication device 100, at some earlier time, to, by default, transmit an associated signature with each outgoing message. The receipt (detected in step 302), by the signature handling application, of the instruction to transmit a response message and an associated signature may be triggered by the user opening a menu and selecting a "send" menu item.

Figure 4:
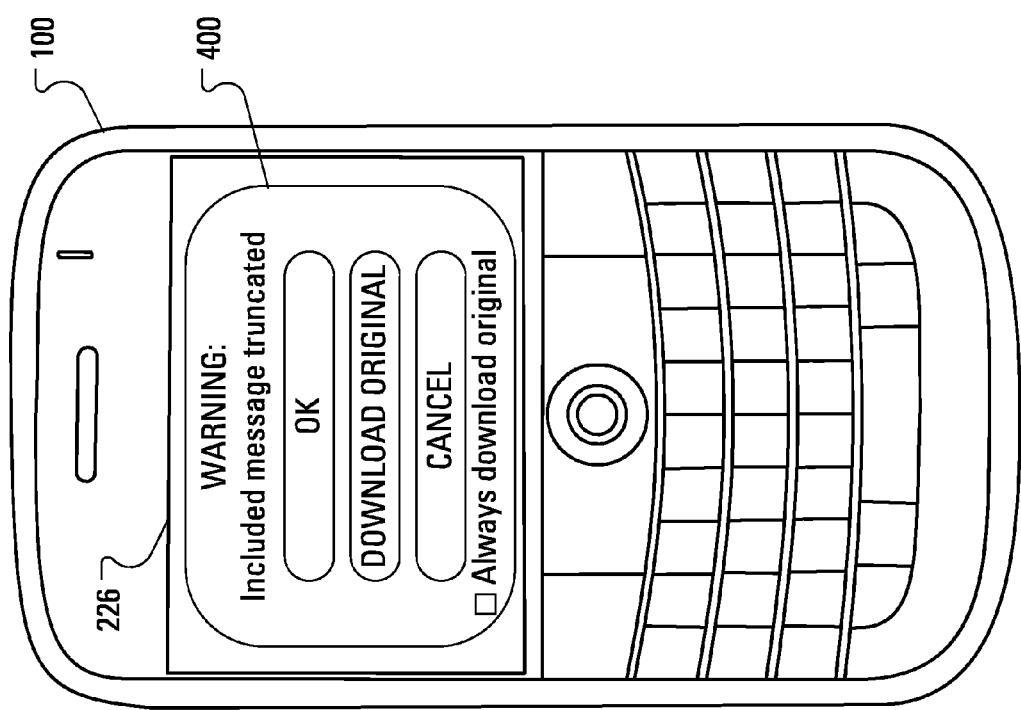
FIG. 4 illustrates an example dialog to warn a user that an e-mail message will be incompletely included in a response message.

Responsive to the detection in step 302, the signature handling application may present (step 304) a dialog to warn the user that the first e-mail message will be incompletely included in the response message and giving the user a choice regarding how or whether to proceed. An example of a suitable dialog is illustrated as a dialog 400 in FIG. 4. The dialog 400 is illustrated as being displayed on the display 226 of the mobile communication device 100.

As has been discussed above, the dialog 400 may include choices labeled "OK" and "Cancel". Furthermore, according to an aspect of the present disclosure, the dialog 400 may include another choice, labeled "Download Original".

It is expected that the user of the mobile communication device 100 will interact with the dialog 400 to select one of the choices. Accordingly, the signature handling application may receive (step 306) an indication of the user selection and determine (step 308) which of the choices the user has selected. Upon determining (step 308) that the user has selected the "Cancel" choice, the signature handling application may return (step 310) control to the message composition user interface.

Upon determining (step 308) that the user has selected the "OK" choice, the signature handling application may generate (step 312) a signature for the response message. To distinguish this signature from an alternative signature to be discussed hereinafter, this signature may be termed a "response" signature. The response signature is a result of encrypting a hash of the response message, where the response message includes the new portion, recently composed by the user of the mobile communication device 100, and the initial portion of the first e-mail message (i.e., not the entire first e-mail message). The signature handling application may then arrange the transmission (step 314) of the response message and the response signature.

Upon determining (step 308) that the user has selected the "Download Original" choice, the signature handling application may obtain (step 316) the remainder of the first e-mail message from the wireless mail server 118 and form (step 318) a "new" message. The new message may be formed from the new portion, recently composed by the user of the mobile communication device 100, and the entirety of the first e-mail message, obtained in step 316. The signature handling application may then generate (step 320) a signature for the new message. To distinguish this signature from the "response" signature, this signature may be termed a "new" signature. The new signature is a result of encrypting a hash of the new message. The signature handling application may then arrange the transmission (step 322) of the new message and the new signature.

Additionally, the warning dialog 400 may include a checkbox labeled "Always download original". By selecting the checkbox labeled "Always download original" and then selecting the "Download Original" choice, the user may effectively set a policy for the mobile wireless device, where the policy indicates that all future signed, and/or encrypted, messages are to include the entirety of the original received message.

As a further alternative, the dialog 400 may include a checkbox labeled "Always send truncated" (not shown). By selecting the checkbox labeled "Always send truncated" (not shown) and then selecting the "OK" choice, the user may effectively set a policy for the mobile wireless device, where the policy indicates that all future signed, and/or encrypted, messages are to include only a truncated version of the original received message.

Apart from the dialog 400, the user may be provided with an opportunity to establish a policy through editing a policy through use of a configuration options user interface. Such a configuration options user interface may allow the user to specify a size threshold for the original message so that an original message exceeding the size threshold is not automatically downloaded in its entirety for inclusion in the new message.

Notably, the automatic downloading of the original message may be accomplished on a background thread so that the user does not have to wait for the original message to be downloaded before carrying out further activities on the mobile communication device 100. Responsive to indicating that the message is to be sent, the user may be prompted for a signing password, but the cryptographic key, for encrypting a hash of the new message, would not be used until after the original message has been downloaded.

Notably, the original message may not always be downloaded immediately. The mobile communication device 100 makes use of a data network connection to download the original message. Accordingly, in the absence of a data network connection, the mobile communication device 100 waits until a data network connection has been established, before downloading the original message.

Figure 5:
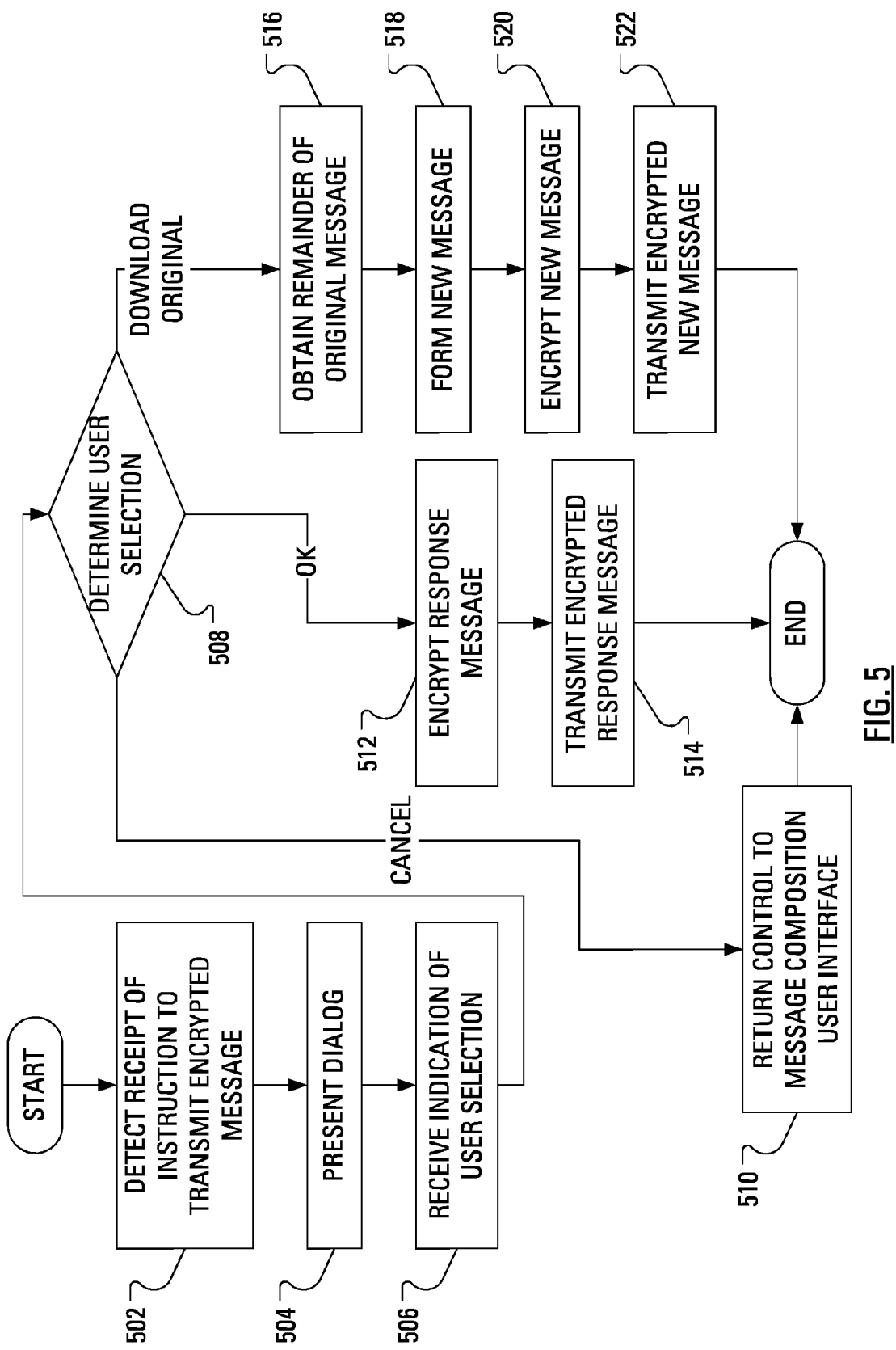
FIG. 5 illustrates example steps in the method of FIG. 3, where the processing comprises encrypting.

The first cross-component message signing approach may be adapted for message encryption instead of, or in addition to, message signing. Steps of a method that is an example of adapting the first cross-component message signing approach to encryption are presented in FIG. 5. Initially, the processor 228, or, more accurately, an encryption handling application executed on the processor 228, detects receipt (step 502) of an instruction to transmit an encrypted response message. Such an instruction may be received from the message composition user interface application also executed on the processor 228.

From the user's perspective, the user has specified that the response message is to be encrypted and the user has composed the new portion of the response message (in any order). The user may have configured the mobile communication device 100, at some earlier time, to, by default, encrypt each outgoing message. The receipt (detected in step 502), by the encryption handling application, of the instruction to transmit an encrypted version of the response message may be triggered by the user opening a menu and selecting a "send" menu item.

Responsive to the detection in step 502, the encryption handling application may present (step 504) a dialog to warn the user that the first e-mail message will be incompletely included in the response message and giving the user a choice regarding how or whether to proceed. An example of a suitable dialog is illustrated as a dialog 400 in FIG. 4. The dialog 400 is illustrated as being displayed on the display 226 of the mobile communication device 100.

As has been discussed above, the dialog 400 may include choices labeled "OK" and "Cancel". Furthermore, the dialog 400 may include another choice, labeled "Download Original".

It is expected that the user of the mobile communication device 100 will interact with the dialog 400 to select one of the choices. Accordingly, the encryption handling application may receive (step 506) an indication of the user selection and determine (step 508) which of the choices the user has selected. Upon determining (step 508) that the user has selected the "Cancel" choice, the encryption handling application may return (step 510) control to the message composition user interface.

Upon determining (step 508) that the user has selected the "OK" choice, the encryption handling application may encrypt (step 512) the response message. The encryption handling application may then arrange the transmission (step 514) of the encrypted response message.

Upon determining (step 508) that the user has selected the "Download Original" choice, the encryption handling application may obtain (step 516) the remainder of the first e-mail message from the wireless mail server 118 and form (step 518) a "new" message. The new message may be formed from the new portion, recently composed by the user of the mobile communication device 100, and the entirety of the first e-mail message, obtained in step 516. The encryption handling application may then encrypt (step 520) the new message. The encryption handling application may then arrange the transmission (step 522) of the encrypted new message.

A second cross-component message signing approach involves splitting the signing operation between the mobile communication device 100 and the wireless mail server 118, thereby avoiding the downloading of the original message. Unlike the first approach, this split-signing approach cannot be considered to result in true end-to-end security, because the entire e-mail message is not signed strictly at the mobile communication device 100. Rather, at least the new portion, recently composed by the user of the mobile communication device 100, is signed strictly at the device, and the signing of the entire message, including the remainder not signed strictly at the device, involves the wireless mail server 118. However, this second approach does provide a compromise between security and use of wireless channel resources, which makes it particularly suitable for signing large messages or messages with large attachments.

Figure 6:
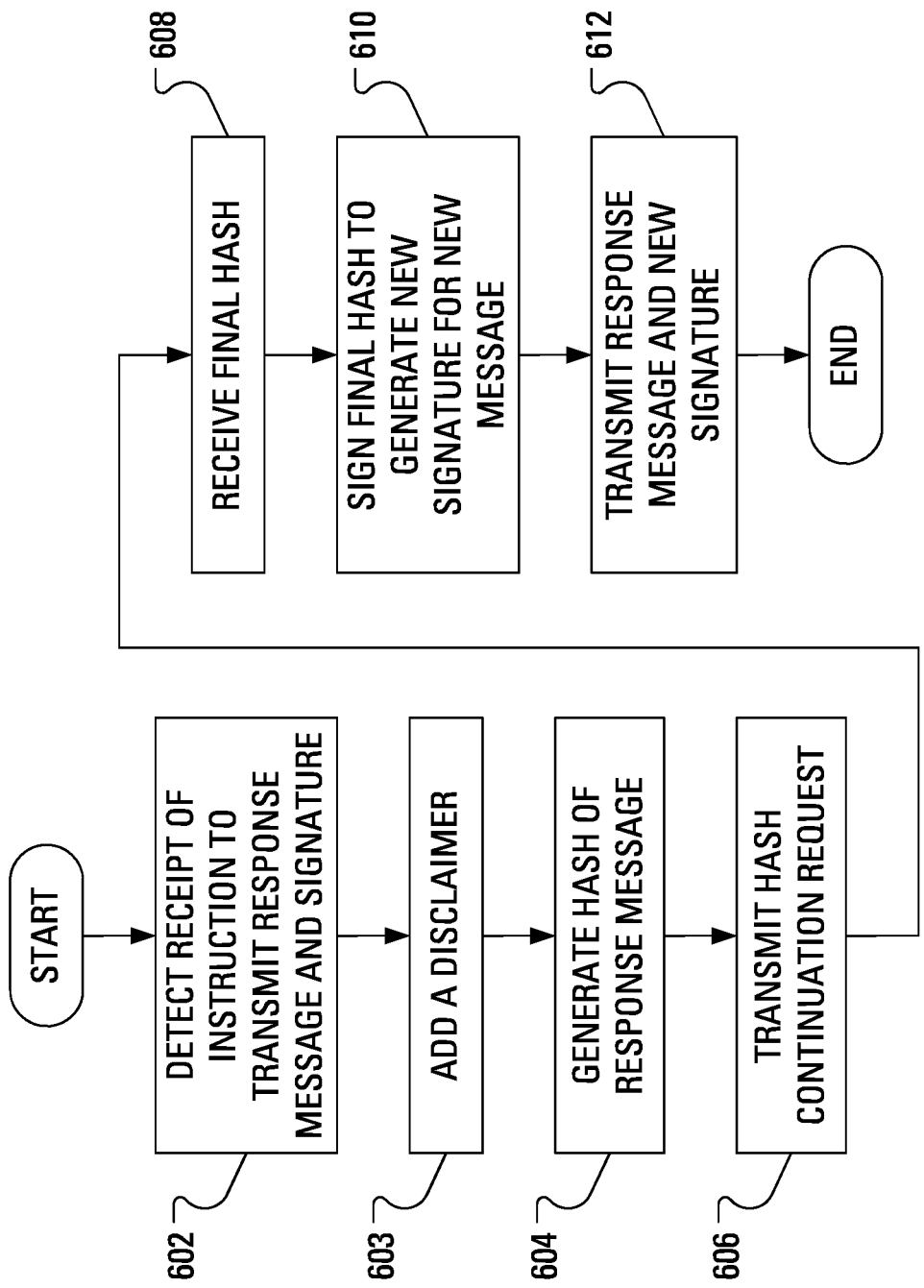
FIG. 6 illustrates example steps in a second method of processing an electronic message at the mobile communication device of FIG. 1, where the processing comprises signing.

Steps of a method that is an example of the second approach are presented in FIG. 6. Initially, the signature handling application detects receipt (step 602) of an instruction to transmit a response message and an associated signature. Such an instruction may be received from the message composition user interface application also executed on the processor 228.

Responsive to the detection in step 602, the signature handling application may automatically add (step 603) a disclaimer to the end of the response message, indicating that this point in the message marks the end of the part of the message signed at the mobile communication device 100 and/or the beginning of the part signed with the assistance of the wireless mail server 118. For example, the disclaimer may be a line of text, such as "—end of device-signed data—". The signature handling application may further obtain (step 604) a hash of the response message, where the response message includes the new portion, recently composed by the user of the mobile communication device 100, and the initial portion of the first e-mail message (i.e., not the entire first e-mail message).

The signature handling application may then arrange the transmission (step 606), to the wireless mail server 118, of a request that the wireless mail server 118 continue the hashing across the first e-mail message. Along with the request, the signature handling application may arrange the transmission of the "context" of the hash of the response message to the wireless mail server 118. The context may be an indication of the internal state of the hashing algorithm. Such an internal state indication may allow the wireless mail server 118 to continue to obtain the hash.

Figure 7:
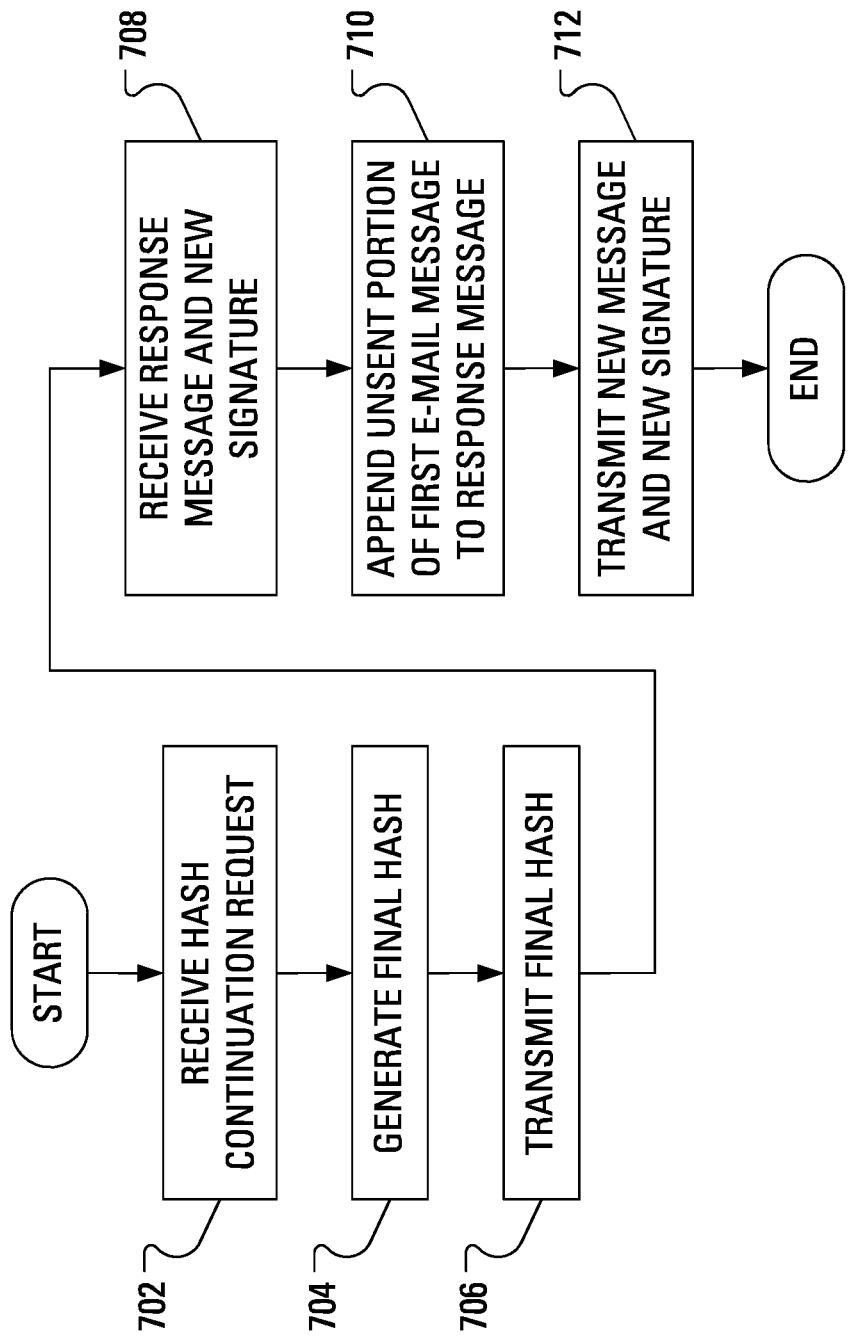
FIG. 7 illustrates example steps in a method of processing an electronic message at the wireless mail server of FIG. 1, in conjunction with the method of FIG. 6.

Steps in an example method of participating, at the wireless mail server 118, in the split signing operation are illustrated in FIG. 7. Initially, the wireless mail server 118 receives (step 702) the hash continuation request. The wireless mail server 118 has awareness of the portion of the first e-mail message that was transmitted to the mobile communication device 100 and can therefore generate (step 704) a "final" hash by hashing the portion of the first e-mail message that has not been transmitted to the mobile communication device 100, where the final hash is a hash of a "new" message. The new message includes the new portion, recently composed by the user of the mobile communication device 100, and the entirety of the first e-mail message.

Alternatively, if the hashing algorithm is a "streaming" algorithm, the mobile communication device 100 may transmit, to the wireless mail server 118, the current value of the hash.

Upon completing generation (step 704) of the hash across the first e-mail message, the wireless mail server 118 transmits (step 706) the final hash to the mobile communication device 100. It should be clear that the final hash is likely to be significantly smaller than the remainder of the original message.

Upon receiving (step 608) the final hash from the wireless mail server 118, the mobile communication device 100 signs (step 610) the final hash and arranges (step 612) the transmission of the response message and the encrypted hash to the wireless mail server 118. The encrypted hash may be called the new signature.

Upon receiving (step 708) the response message and the new signature, the wireless mail server 118 constructs the new message by appending (step 710) the portion of the first e-mail message that has not been transmitted to the mobile communication device 100 to the response message and transmits (step 712) the new message and the new signature.

Since the second cross-component message signing approach represented by the methods of FIGS. 6 and 7 may not be considered to result in true, end-to-end security, the user may be provided with an opportunity to select the second cross-component message signing approach on a per-message basis, depending on the size of the data and/or security requirements.

In a third cross-component message signing approach, the entire hash is generated on the wireless mail server 118. The user composes the new portion and indicates that the response message and an associated signature are to be sent.

Figure 8:
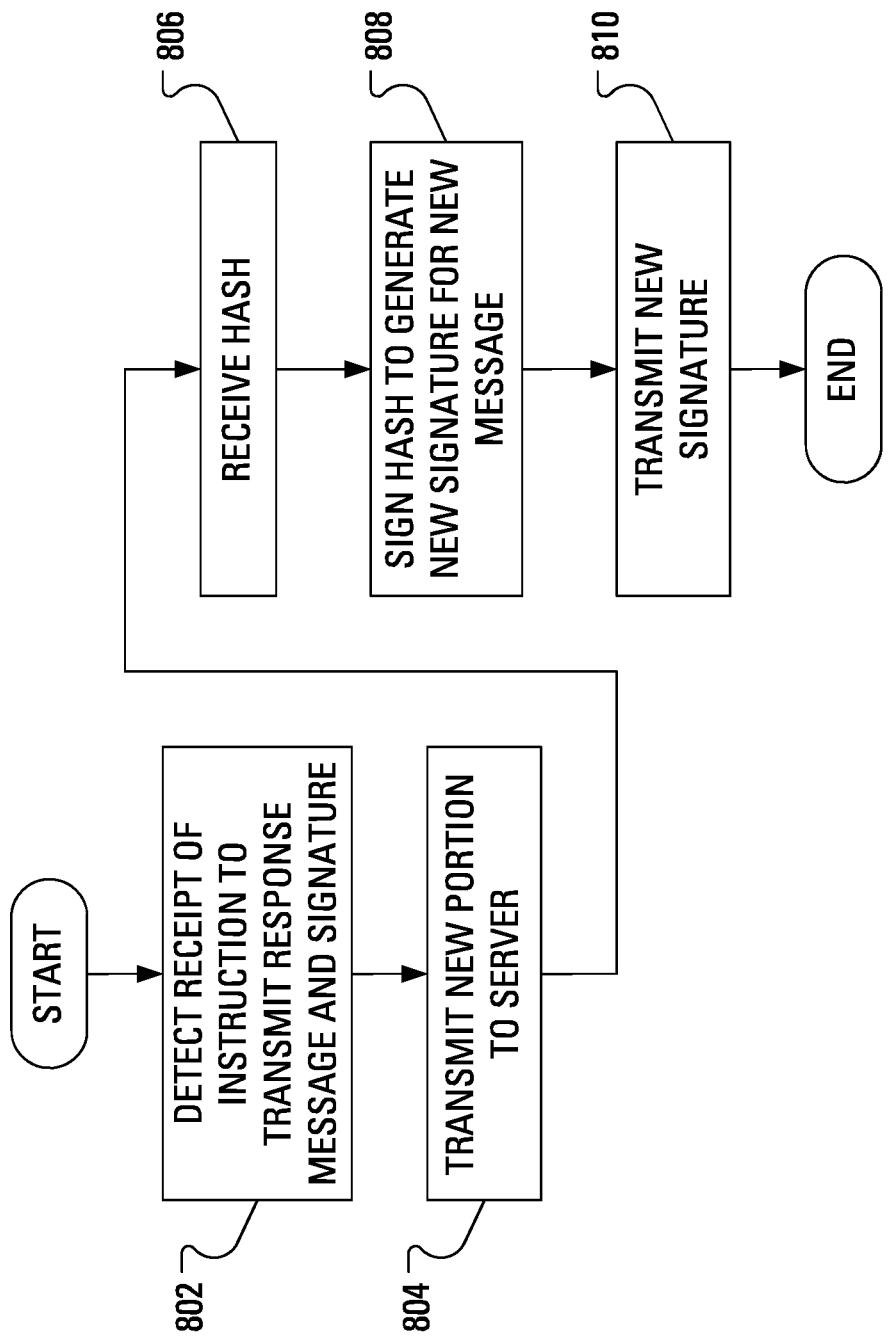
FIG. 8 illustrates example steps in a third method of processing an electronic message at the mobile communication device of FIG. 1, where the processing comprises signing.

Steps of a method that is an example of the third cross-component message signing approach are presented in FIG. 8. Initially, the signature handling application at the mobile communication device 100 detects receipt (step 802) of an instruction to transmit the response message and the associated signature.

Responsive to the detection in step 802, the signature handling application may arrange (step 804) transmission of the new portion to the wireless mail server 118.

Figure 9:
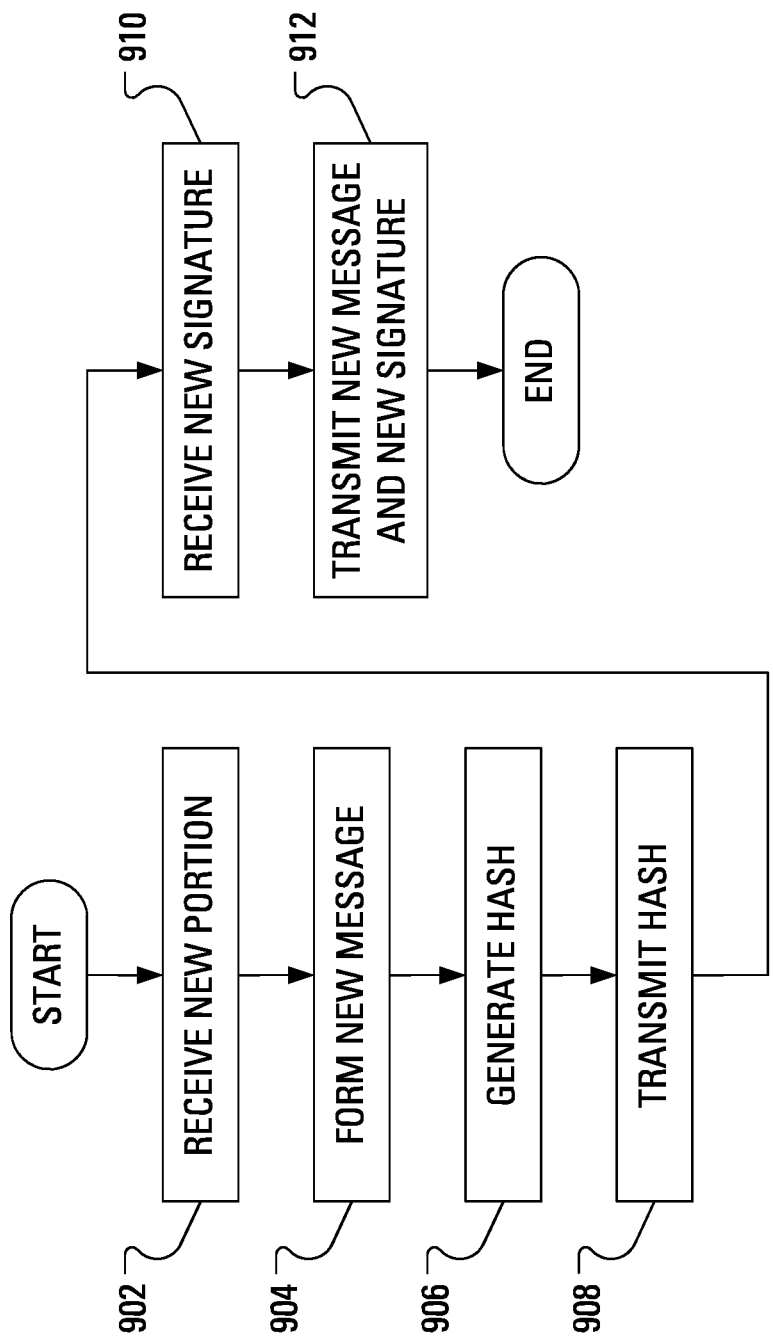
FIG. 9 illustrates example steps in a method of processing an electronic message at the wireless mail server of FIG. 1, in conjunction with the method of FIG. 8.

Steps in an example method of participating, at the wireless mail server 118, in the third cross-component message signing approach are illustrated in FIG. 9. Initially, the wireless mail server 118 receives (step 902) the new portion and appends the first e-mail message to the new portion, thereby forming (step 904) the new message. The wireless mail server 118 then generates (step 906) a hash of the new message. The wireless mail server 118 transmits (step 908) the hash to the mobile communication device 100.

At the mobile communication device 100, the signature handling application receives (step 806) the hash and signs (step 808) the hash to generate the new signature. The signature handling application then arranges (step 810) the transmission of the new signature to the wireless mail server 118.

Upon receipt (step 910) of the new signature, the wireless mail server 118 transmits (step 912) the new message and the new signature.

Message security in the third cross-component message signing approach may be considered to be less "end-to-end" than the second cross-component message signing approach and the third cross-component message signing approach does not appear to provide additional bandwidth-usage enhancements over the second cross-component message signing approach. Accordingly, the third cross-component message signing approach may be considered less desirable than the second cross-component message signing approach.

Both the second cross-component message signing approach and the third cross-component message signing approach include steps in which the mobile communication device 100 signs (step 610, FIG. 6 and step 808, FIG. 8) a hash received from the wireless mail server 118. To sign the hash, the mobile communication device 100 retrieves a private key and uses the private key to sign the received hash. Even if the wireless mail server 118 is considered to be a trusted component that is part of a trusted network, it may be considered insecure to have the mobile communication device 100 sign any hash received from the wireless mail server 118. If the mobile communication device 100 signs any hash it receives from the wireless mail server 118, the wireless mail server 118 has unrestricted control over the private key signing capability of the mobile communication device 100 as long as the mobile communication device 100 is in coverage defined by the wireless carrier network 106. Such a design enables the wireless mail server 118 to sign arbitrary data any time the mobile communication device 100 is in coverage defined by the wireless carrier network 106. Accordingly, there may be use for a mechanism to control access to the private key stored on the mobile communication device 100 when a hash is received for signing.

In overview, it is proposed to restrict control, by the wireless mail server 118, over a private key stored at the mobile communication device 100 by allowing the wireless mail server 118 to obtain a signed version of a transmitted hash only responsive to an explicit request, from the mobile communication device 100, for assistance for signing a message. According to such a restriction, the wireless mail server 118 may only request one signature for every message transmitted from the mobile communication device 100.

Usually, private keys are stored in an encrypted manner in a "key store" in memory (216, 218) at the mobile communication device 100. Access to the key store is protected by a key store password. When the processor 228 is to access the key store to obtain a private key, the processor 228 may arrange presentation of a dialog on the display 226 to prompt a user to enter the key store password. Upon receiving the key store password, the processor 228 may retrieve one or more private keys from the key store.

It is proposed herein that the processor 228 maintain a table of records 1000 (see FIG. 10), where each record 1002 includes a key store access key in a key store access key column 1004 and the key store password in a key store password column 1006. The table 1000 may, for example, only be stored in RAM 218. The key store access key may be a high-entropy random number that cannot be easily guessed by an attacker. The key store access key should also be collision-resistant. For example, the key store access key can be a concatenation of a sequence number (e.g., an integer) and a high-entropy random 256-bit sequence.

Figure 11:
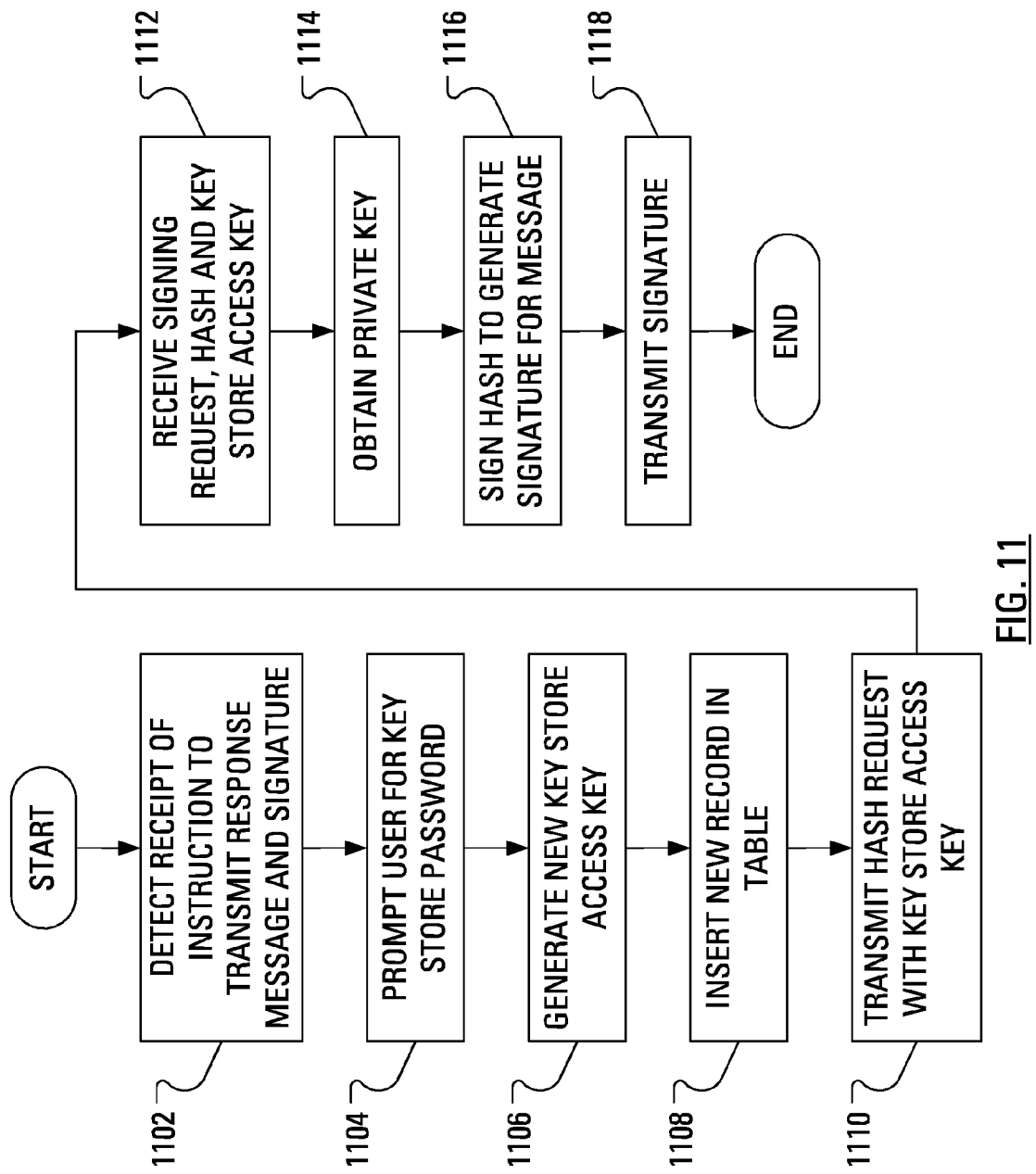
FIG. 11 illustrates example steps of a fourth cross-component message signing approach.

FIG. 11 illustrates example steps of a fourth cross-component message signing approach. Initially, the signature handling application detects receipt (step 1102) of an instruction to transmit a message and an associated signature. Notably, the message may be a response to an original message or may be generated to forward an original message with comments. The instruction may be received (step 1102) from the message composition user interface application also executed on the processor 228.

The processor 228, under control of the signature handling application, may then arrange presentation of a dialog on the display 226 to prompt (step 1104) a user to enter the key store password.

The processor 228, under control of the signature handling application, may then generate (step 1006) a new key store access key and insert (step 1108) a new record 1002 in the table 1000. The new record 1002 includes the new key store access key in the key store access key column 1004 and the response to the prompt in the key store password column 1006.

As is familiar from step 606 of the method of FIG. 6, the signature handling application may then arrange the transmission (step 1110), to the wireless mail server 118, of a request that the wireless mail server 118 generate, and return, a hash for the e-mail message whose transmission was requested in step 1102. The e-mail message whose transmission was requested in step 1102 may be called a composite message and may include a new portion and an original message, even though only an initial portion of the original message may have been received at the mobile communication device 100. The request may include the new portion and a reference to the original message.

Figure 12:
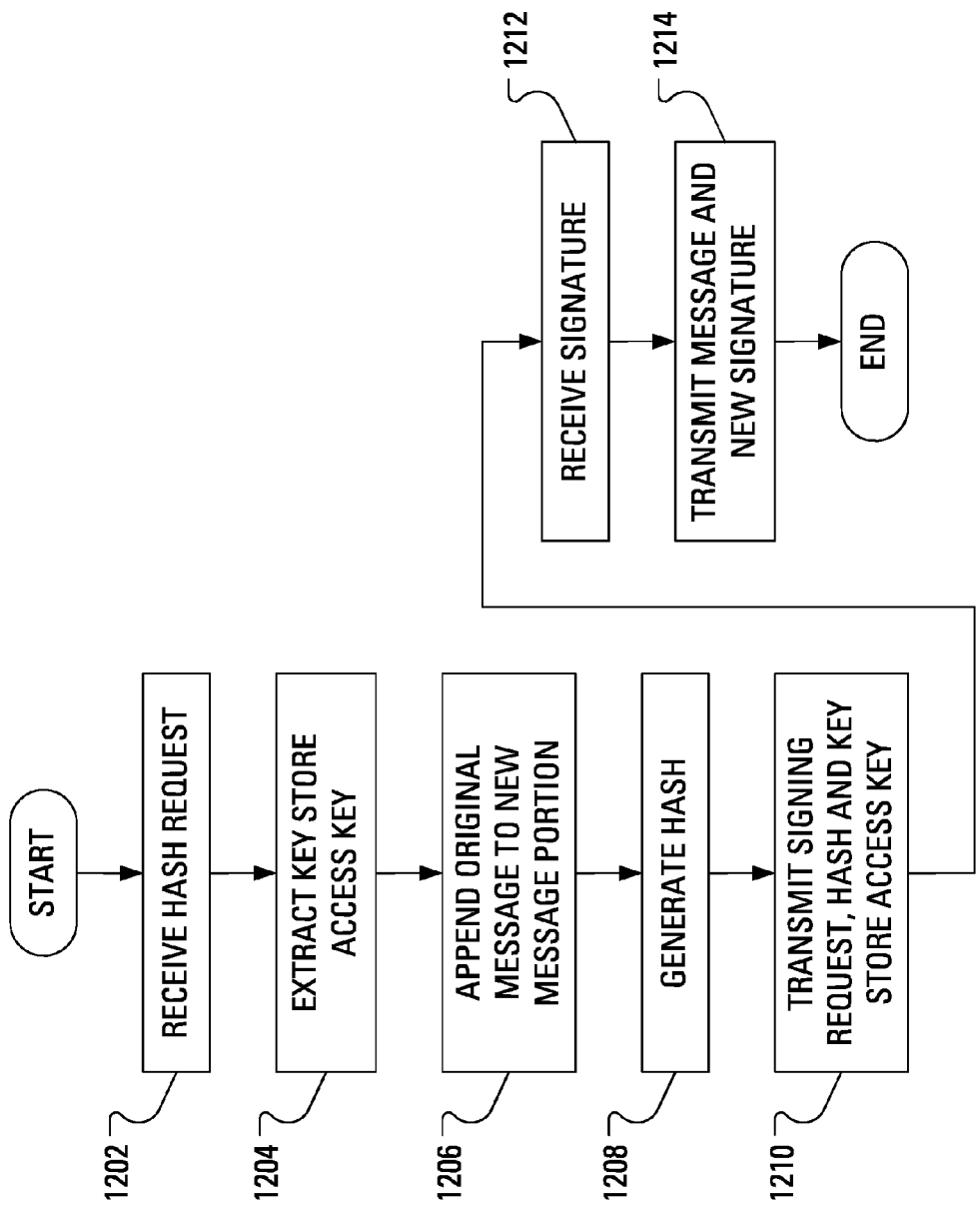
FIG. 12 illustrates example steps in a method of participating, at the wireless mail server, in the fourth cross-component message signing approach of FIG. 11.

FIG. 12 illustrates example steps in a method of participating, at the wireless mail server 118, in the fourth cross-component message signing approach of FIG. 11. Initially, the wireless mail server 118 receives (step 1202) the hash continuation request. The wireless mail server 118 may then extract (step 1204), from the request, the new key store access key.

The wireless mail server 118 may form the composite message by appending (step 1206) the original message to the received new portion. The wireless mail server 118 may in embodiments then generate (step 1208) a hash of the composite message.

In embodiments, to save server hash generation time, the mobile communication device 100 may begin generating a hash, as shown in step 604 of the method of FIG. 6, and may include a context for the hashing algorithm in the request to the server. In this case, the wireless mail server 118 has awareness of the portion of the first e-mail message that was transmitted to the mobile communication device 100 and can therefore generate (step 1208) a "final" hash by continuing the hash started at the mobile communication device 100 hashing the portion of the e-mail message that has not been transmitted to the mobile communication device 100.

Upon completing generation (step 1208) of the hash across the first e-mail message, the wireless mail server 118 transmits (step 1210), to the mobile communication device 100, a signing request that includes the hash along with the key store access key extracted in step 1204.

Upon receiving (step 1112) the signing request with the hash and the key store access key from the wireless mail server 118, the processor 228 obtains (step 1114) the private key from the key store.

Figure 13:
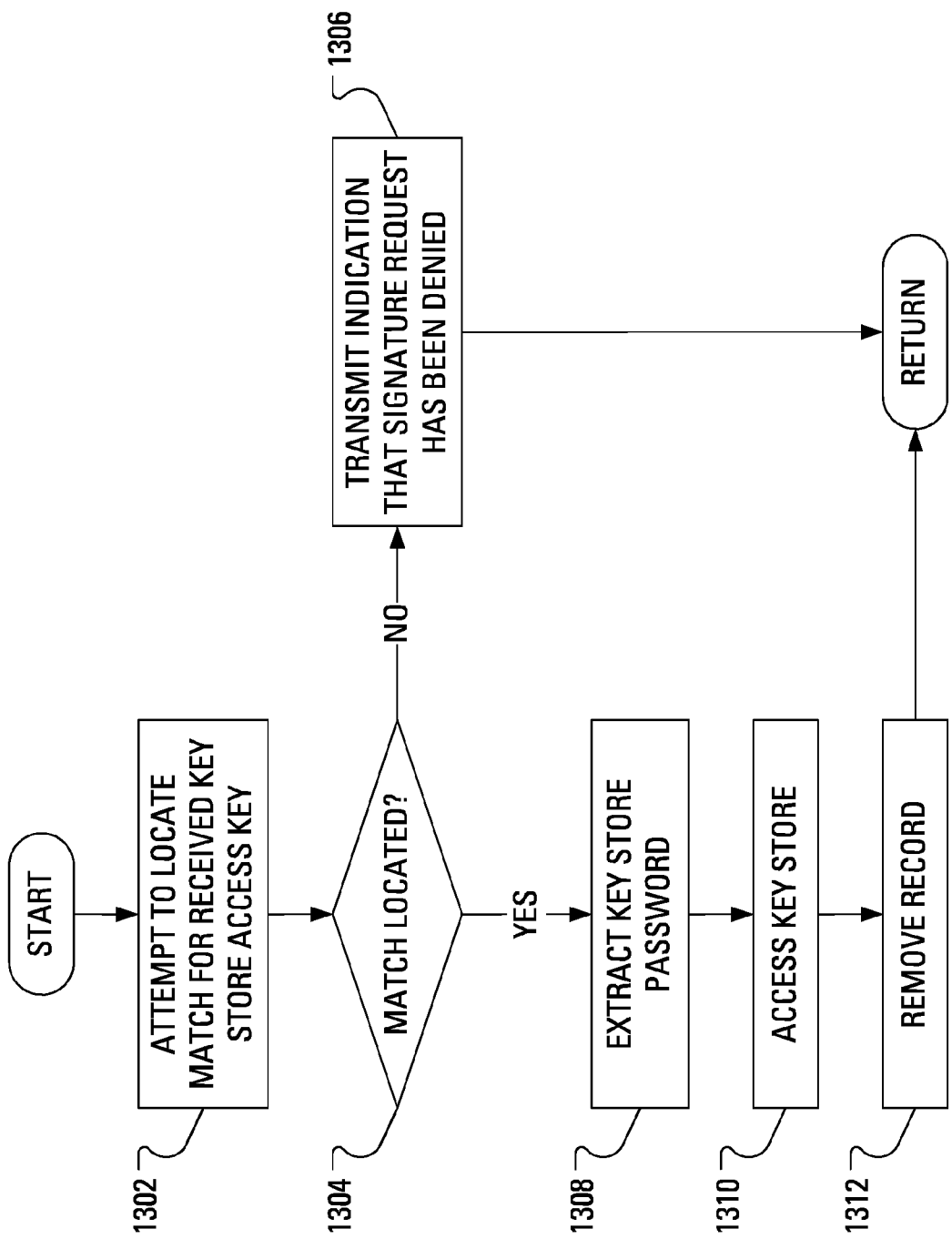
FIG. 13 illustrates example steps in a method of obtaining a private key from a key store, as included in the fourth cross-component message signing approach of FIG. 11.

FIG. 13 illustrates example steps in a method of obtaining (step 1114) the private key from the key store. Obtaining (step 1114) the private key from the key store may, for instance, involve the processor 228 attempting (step 1302) to locate, in the key store access key column 1004 of the table 1000, a match for the received key store access key.

Upon determining (step 1304) that the received key store access key does not match any of the key store access keys in the key store access key column 1004 of the table 1000, the processor 228 may transmit (step 1306), to the wireless mail server 118, an indication that the signing request has been denied.

As a result of denying the signing request, the wireless mail server 118 is unable to complete the signing of the composite message. The wireless mail server 118 may abort the planned transmission of the composite message and may transmit, to the mobile communication device 100, an indication that the message was not sent. Upon noticing that the message has not been successfully sent, the user may initiate re-transmission of the composite message, thereby effectively starting the method of FIG. 11 over again.

Upon determining (step 1304) that a matching key store access key for the received key store access key is located in the key store access key column 1004 of the table 1000, the processor 228 may extract (step 1308) the key store password that is in the key store password column 1006 of the record with the matching key store access key. The processor 228 may then employ the extracted key store password to access the key store (step 1310) to obtain (step 1114, FIG. 11) the private key. The processor 228 may then remove (step 1312), from the table 1000, the record with the matching key store access key.

In the case wherein the key store contains multiple private keys, accessing the key store (step 1310) to obtain (step 1114, FIG. 11) the private key may involve identifying which of multiple private keys is desired to be obtained. One manner in which a given private key may be identified is by certificate issuer distinguished name and certificate sequence number. Accordingly, a certificate issuer distinguished name and a certificate sequence number may be included in the hash request whose transmission to the wireless mail server 118 is arranged by the processor 228 in step 1110. Subsequently, the certificate issuer distinguished name and the certificate sequence number may be included in the signing request transmitted by the wireless mail server 118 to the mobile communication device 100 in step 1210.

For increased security, the processor 228 may remove, from the table 1000, any record that has an age greater than a threshold age. An example threshold age is 10 minutes. To this end each record may be associated with a creation time stamp. The processor 228 may periodically determine an age of a given record by comparing a current time to the creation time stamp associated with the given record.

Returning to FIG. 11, upon obtaining (step 1114) the private key, the processor 228 uses the private key to sign (step 1116) the hash to result in a signed hash. The processor 228 then arranges (step 1118) transmission of the signed hash to the wireless mail server 118. The signed hash may be called the signature.

Upon receiving (step 1212) the signature, the wireless mail server 118 transmits (step 1214) the message and the signature.

Figure 10:
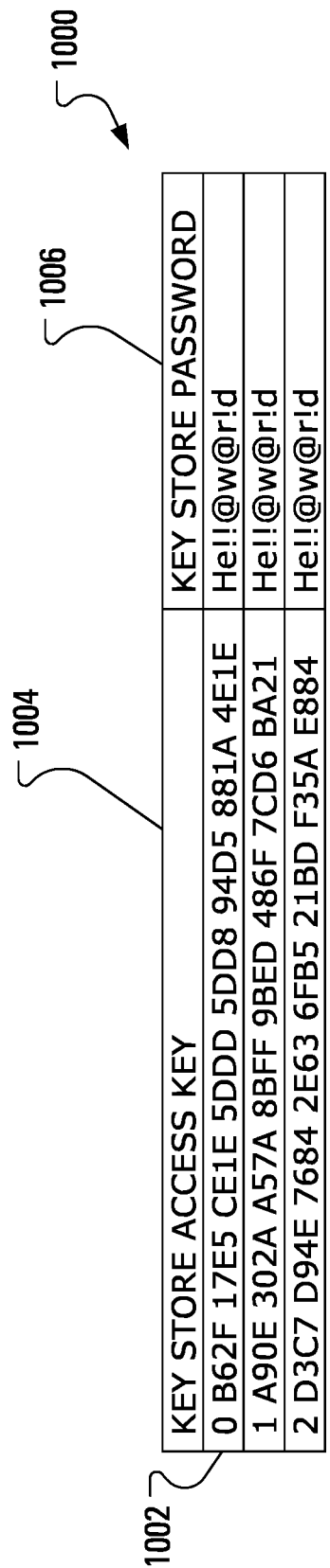
FIG. 10 illustrates a table of records, where each record includes a key store access key in a key store access key column and a key store password in a key store password column.

FIG. 14 illustrates an alternative table 1400 to the table 1000 of FIG. 10. In the alternative table 1400, each record 1402 includes a private key access key in a private key access key column 1404 and a private key in a private key column 1406. The private key may be formatted according to PKCS8, which is a Private-Key Information Syntax Standard, described in Internet Engineering Task Force (IETF) Request For Comment (RFC) 5208 (see tools.ieff.org/html/rfc5208).

Figure 15:
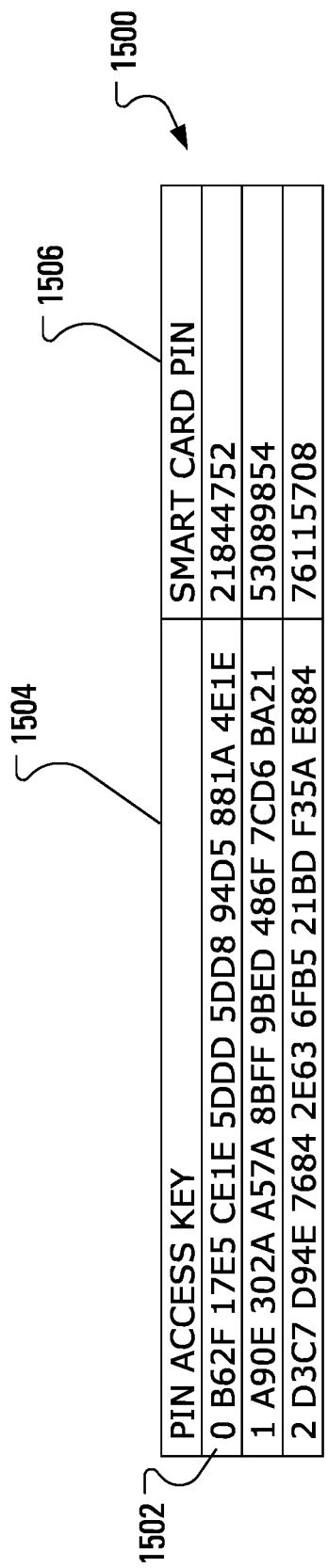
FIG. 15 illustrates a further alternative table to the tables of FIGS. 10 and 14, wherein each record includes a PIN access key in a PIN access key column and a smart card PIN in a smart card PIN column.

FIG. 15 illustrates a further alternative table 1500 to the tables 1000, 1400 of FIGS. 10 and 14. In the further alternative table 1500, each record 1502 includes a PIN access key in a PIN access key column 1504 and a smart card Personal Identification Number (PIN) in a smart card PIN column 1506.

In the case wherein multiple private keys are stored on the smart card, accessing the smart card (step 1310) to obtain (step 1114, FIG. 11) the private key may involve identifying which of multiple private keys is desired to be obtained. As discussed hereinbefore, a certificate issuer distinguished name and a certificate sequence number may be included in the hash request whose transmission to the wireless mail server 118 is arranged by the processor 228 in step 1110. Subsequently, the certificate issuer distinguished name and the certificate sequence number may be included in the signing request transmitted by the wireless mail server 118 to the mobile communication device 100 in step 1210.

In general, the received access key is used for extraction of a secondary value that is used to obtain the private cryptographic key. In embodiments, the secondary value is the private cryptographic key; in embodiments, the secondary value is a smart card PIN or a key store access password that control access to a smart card or key store, respectively, which stores the private cryptographic key. In embodiments, the secondary value is any of the above values (private cryptographic key, smart card PIN, key store access password) masked with a mask S.

The system may be further strengthened by avoiding keeping key store passwords in the key store password column 1006 (see FIG. 10) in RAM 118. The processor 228 may, instead, generate a mask, "S". The mask may be, for example, a high-entropy bit string.

Instead of storing key store password "P" in the table 1000, the processor 228 can store a masked password "S1" obtained from the expression "S1=S XOR P", where "XOR" is representative of the known bitwise Boolean exclusive-OR operation.

While arranging the transmission (step 1110, see FIG. 11), to the wireless mail server 118, of a request to generate a hash for the composite message, the signature handling application may include, within the hash request, the mask S along with the new key store access key that was generated in step 1106.

Immediately upon sending the request (including the mask S) to the wireless mail server 118, the signature handling application may discard the mask S.

When the wireless mail server 118 transmits (step 1208) a signing request to the mobile communication device 100, the signing request may include the final hash, the key store access key extracted in step 1204 and the mask S.

Upon receiving (step 1112) the signing request with the final hash, the key store access key and the mask S from the wireless mail server 118, the processor 228 obtains (step 1114) the private key from the key store.

Obtaining (step 1114) the private key from the key store may, for instance, involve the processor 228 attempting (step 1302, FIG. 13) to locate, in the key store access key column 1004 of the table 1000, a match for the received key store access key.

Upon determining (step 1304) that a matching key store access key for the received key store access key is located in the key store access key column 1004 of the table 1000, the processor 228 may extract (step 1308) the masked password 51 from the key store password column 1006 of the record with the matching key store access key.

The processor 228 may retrieve the key store password P by carrying out the XOR operation between the mask S and the masked password 51. That is, a result "R" may be obtained by determining R=S XOR 51.

Since the masked password S1=S XOR P, then R=S XOR (S XOR P)=(S XOR S) XOR P=0 XOR P=P.

Upon obtaining the key store password P, The processor 228 may then employ the key store password P to access the key store (step 1310) to obtain (step 1114, FIG. 11) the private key. The processor 228 may then remove (step 1312), from the table 1000, the record with the matching key store access key.

Conveniently, storage time for the key store password P is relatively short. Instead, the masked password S1=S XOR P is stored. However, since the mask S is a high-entropy random string, it may be considered that S1 yields no information about the key store password P. Also, since the mask S, which is sent to the wireless mail server 118, is a random string, the mask S provides no information about the key store password P.

As should be clear, P may not be the key store password. Instead, P may be, for two examples, a private cryptographic key or a smart card PIN.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. At a mobile wireless communication device, a method of processing an electronic message, said method comprising:
   detecting receipt of an instruction to sign a composite message, where said composite message is formed by a server associated with said mobile wireless communication device, said composite message including a new message portion and an original message, and only an initial portion of said original message is available at said mobile wireless communication device;
   generating an access key;
   inserting a record in a table, stored at said mobile wireless communication device, said record including said access key and a secondary value for use in obtaining a private cryptographic key;
   transmitting a processing request to said server associated with said mobile wireless communication device, said processing request including said new message portion, a reference to said original message, and said access key;
   receiving a signing request from said server, said signing request including a received access key and a hash of said composite message;
   locating in said table, the record with the access key that matches said received access key;
   extracting, from said record, said secondary value;
   obtaining said private cryptographic key by using said secondary value;
   employing said private cryptographic key to sign said hash to form a digital signature; and
   transmitting said digital signature to said server.

2. The method of claim 1 further comprising removing said record from said table after said extracting.

3. The method of claim 1 wherein said record further comprises an associated creation time stamp.

4. The method of claim 1 further comprising:
   generating a mask;
   employing said mask for generation of said secondary value; and
   deleting said mask after said employing;
   wherein said processing request includes said mask and said signing request includes said mask for use with said received access key for obtaining said private cryptographic key.

5. The method of claim 1 wherein said secondary value comprises a key store password.

6. The method of claim 1 further comprising obtaining a Personal Identification Number (PIN) for use in obtaining data stored on a smart card, where said private cryptographic key is among said data stored on said smart card, wherein said secondary value comprises said PIN.

7. The method of claim 1 wherein said secondary value comprises a private cryptographic key file formatted according to a Private-Key Information Syntax Standard.

8. The method of claim 1 wherein said access key comprises a concatenation of an integer and a random 256-bit sequence.

9. A mobile wireless communication device comprising a processor and a communication subsystem, said communication subsystem including a receiver and a transmitter, said processor adapted to:
   detect receipt of an instruction to sign a composite message, where said composite message is formed by a server associated with said mobile wireless communication device, said composite message including a new message portion and an original message, and only an initial portion of said original message is available at said mobile wireless communication device;
   generate an access key;
   insert a record in a table, stored at said mobile wireless communication device, said record including said access key and a secondary value for use in obtaining a private cryptographic key;
   transmit, via said transmitter, a processing request to a server associated with said mobile wireless communication device, said request including said new message portion, a reference to said original message and said access key;
   receive, via said receiver, a signing request from said server, said signing request including a received access key and a hash of said composite message;
   locate in said table, the record with the access key that matches said received access key;
   extract, from said record, said secondary value;
   obtain said private cryptographic key by using said secondary value;
   employ said private cryptographic key to sign said hash to form a digital signature; and
   transmit, via said transmitter, said digital signature to said server.

10. The mobile wireless communication device of claim 9 wherein said processor is further adapted to remove said record from said table after said extracting.

11. The mobile wireless communication device of claim 9 wherein said record further comprises an associated creation time stamp.

12. The mobile wireless communication device of claim 9 wherein said secondary value comprises a key store password.

13. The mobile wireless communication device of claim 9 wherein said processor is further adapted to obtain a Personal Identification Number (PIN) for use in obtaining data stored on a smart card, where said private cryptographic key is among said data stored on said smart card, wherein said secondary value comprises said PIN.

14. The mobile wireless communication device of claim 9 wherein said access key comprises a concatenation of an integer and a random 256-bit sequence.

15. A non-transitory computer-readable medium containing computer-executable instructions that, when performed by a processor in a mobile wireless communication device, cause said processor to:
  detect receipt of an instruction to sign a composite message, where said composite message is formed by a server associated with said mobile wireless communication device, said composite message including a new message portion and an original message, and only an initial portion of said original message is available at said mobile wireless communication device;
  generate an access key;
  insert a record in a table, stored at said mobile wireless communication device, said record including said access key and a secondary value for use in obtaining a private cryptographic key;
  transmit a processing request to a server associated with said mobile wireless communication device, said request including said new message portion, a reference to said original message and said access key;
  receive a signing request from said server, said signing request including a received access key and a hash of said composite message;
  locate in said table, the record with the access key that matches said received access key;
  extract said secondary value;
  obtain said private cryptographic key by using said secondary value;
  employ said private cryptographic key to sign said hash to form a digital signature; and
  transmit said digital signature to said server.

16. The non-transitory computer-readable medium of claim 15 wherein the instructions further cause said processor to remove said record from said table after said extracting.

17. The non-transitory computer-readable medium of claim 15 wherein said record further comprises an associated creation time stamp.

18. The non-transitory computer-readable medium of claim 15 wherein said secondary value comprises a key store password.

19. The non-transitory computer-readable medium of claim 15 wherein the instructions further cause said processor to obtain a Personal Identification Number (PIN) for use in obtaining data stored on a smart card, where said private cryptographic key is among said data stored on said smart card, wherein said secondary value comprises said PIN.

20. The non-transitory computer-readable medium of claim 15 wherein said access key comprises a concatenation of an integer and a random 256-bit sequence.

* * * * *